Patented Jan. 1, 1952

2,580,488

UNITED STATES PATENT OFFICE 2,580,488

PROTECTIVE COMPOSITION FOR METAL SURFACES

Henry L. Vogl and Anna Mae Stieber, Racine, Wis., assignors to S. C. Johnson & Son, Inc., Racine, Wis.

No Drawing. Application January 5, 1949, Serial No. 69,406

15 Claims. (Cl. 260—26)

1

This invention relates to a protective coating composition for metals. More specifically, the invention relates to a liquid protective coating composition which is capable of rendering metal surfaces resistant to rust and corrosion.

One of the important, yet unmaterialized economies to be obtained through the use of wax or wax-like substances is protection of iron, steel and other metals from rust and corrosion. Although metallurgical chemists have been extensively experimenting in an effort to mitigate the enormous toll placed upon industry through metallic corrosion, the potentialities of a wax composition have not been developed since seemingly unsurmountable problems have appeared as unsolvable. In order to satisfactorily coat, and subsequently protect a metallic surface, it is necessary that the wax composition produce a film which is adhesive and flexible, yet durable and hard. A continuous film upon the metal treated can be provided only where the wax or wax-like material is completely in solution. Because of the obvious danger in coating with a solution which requires continual heating, it is necessary that the non-volatile content of the composition be completely in solution at room temperature. Tackiness of the appliel composition cannot be tolerated, for handling of the coated metal objects will then cause fragments of the film to adhere to the hands, leaving the metal exposed to corrosion.

Now, in accordance with our invention, we have discovered a liquid protective coating composition for metal comprising from 12 to 35% by weight of the composition of a polyvinyl ether having from 14 to 24 carbon atoms and a resin having a melting point of at least 85° C., selected from the group consisting of polyhdric alcohol rosin esters, terpene resins, rosin maleates and mixtures thereof. The ether and resin are present in a ratio of from 1:3 to 3:1 and are completely soluble at a temperature of 21° C. in a solvent selected from the group consisting of liquid hydrocarbons, liquid ethers, liquid chloro-compounds and mixtures thereof. The solvent comprises the major portion by weight of the composition.

Now, having indicated in a general way, the nature and purpose of this invention, the following examples will illustrate the invention. It is to be understood, however, that such examples are presented merely as illustrations of the invention, and are not to be construed as limiting the same. In the examples, the ingredients are given in parts by weight, unless otherwise indicated.

2

*Example 1*

One hundred twenty eight parts of pentaerythritol ester of rosin, having a softening point of 123° C., and 72 parts of polymeric octodecyl vinyl ether were melted by heating in a suitable vessel to a temperature of approximately 140° C. Six hundred forty eight parts of naphtha were then admixed with the molten ester and polyvinyl ether. When the solution cooled to a temperature of approximately 21° C., ferrous metal stampings were dipped in the solution. After exposure to room atmosphere for about 30 minutes, the solvent had completely volatilized from the metal, leaving thereon a hard, non-tacky, waxy film. The various coated stampings and identical uncoated stampings were placed in a humidity cabinet regulated at 100% relative humidity and a temperature of 100° F. After a period when corrosion was visibly evident upon the uncoated stampings, the coated metals were taken from the cabinet and upon close inspection revealed no indications of corrosion. A durable, non-tacky film remained upon the coating stampings.

*Example 2*

One hundred three parts of rosin-modified maleic alkyd resin, having a softening point of 121° C., and 67 parts of polymeric octodecyl vinyl ether were melted by heating in a suitable vessel to a temperature of approximately 140° C. Eight hundred ninety eight parts of toluene were then admixed with the molten rosin ester and polyvinyl. Copper tubings were treated with the resulting solution and tests performed as shown in Example 1. The results were substantially the same as shown in that example.

*Example 3*

Example 2 was repeated and all constituents and quantities thereof remained the same except that 103 parts of terpene-modified rosin ester having a softening point of 110° C. was substituted for the 103 parts of rosin-modified alkyd resin. The results obtained were substantially the same as those of Example 2.

*Example 4*

Ferrous metal machine parts and forgings, and pieces of sheet brass were coated with the composition of Example 1. The coated articles and identical uncoated articles were tested as shown in Example 1 and the results were substantially the same as shown in that example.

In the above examples, there has thus been illustrated our improved composition and process for coating metals in order to render the metals non-susceptible to rust and corrosion.

Whereas naphtha and toluene are disclosed in the examples as satisfactory solvents, certain other volatile liquid solvents are operable. These include hydrocarbons such as benzene, xylene, cymene, kerosene and dipentene; chloro-compounds such as chlorhydrins, sym-dichlorethyl ether and carbon tetrachloride; and ethers such as isopropyl ether. The selected solvent constitutes the major portion by weight of the composition preferably from about 65% to about 88% by weight of the composition.

In Example 1, the non-volatile content comprised approximately 23.6% by weight of the finished solution and in Example 2, approximately 15.9%. It should be understood, however, that a non-volatile content may be employed within a range of from 12 to 35% by weight of the solution. Where less than 12% is incorporated, the film produced upon the treated metal articles will be too thin to offer sufficient and durable rust and corrosion prevention. When the prefered maximum, 35% is exceeded, the resulting solution does not possess the desirable stability qualities. Then too, I have found a solution having more than 35% solids content is not apt to remain a "true" solution under ordinary conditions of application. That is, when the solution is subjected to a temperature of approximately 21° C., minute particles of the non-volatile content tend to "throw themselves out" of solution. This condition is undesirable since the film produced upon metal articles from such a solution would contain small solidified aggregates. These aggregates, through subsequent handling of the treated article, may be dislodged from the metal surface, permitting exposure to corrosion.

Although octodecyl polyvinyl ether was heretofore disclosed in the examples, any polyvinyl ether having from 14 to 24 carbon atoms is satisfactorily operable. An ether with less than 14 carbon atoms has good solubility characteristics, but renders a film which is too tacky. Whereas, the polyvinyl ether having more than 24 carbon atoms is capable of producing a hard, non-tacky film, it cannot be employed at room temperature (approximately 21° C.), since it lacks the desired low solubility point. These polyvinyl ethers may be prepared in the manner disclosed by Reppe in his United States Patents Nos. 2,104,000, 2,104,001 and 2,104,002.

The solids content of the composition must be complemented with the inclusion of a critical quantity of a resin which possesses a softening point of at least 85° C. and which is capable of being completely soluble at room temperature in the above-mentioned solvents. Furthermore, the resin must be selected from the group consisting of polyhydric rosin esters, demonstrated in Examples 1 and 4 with the use of a pentaerythritol rosin ester; terpene resins, demonstrated with terpene-modified rosin ester in Example 3; and rosin maleates, demonstrated with rosin-modified maleic alkyd resin in Example 2. The use of a resin, selected from the above-disclosed group, which has a softening point of less than 85° C. should be avoided since the inclusion of such a resin will produce a tacky film upon the treated metal.

The softening points of the various selected resins as disclosed in the examples were calculated by means of the ring and ball method as prescribed by the American Society for Testing Material.

In formulating the solids content of the composition, certain ratios between the polyvinyl ether and the resin must be observed. Where more than three parts of ether per part of resin are employed, the resulting metal coating does not possess sufficient adhesive ability. If less than one part of ether per three parts of resin is incorporated, a film will be rendered which has a tendency to be tacky or sticky. Therefore, a ratio of from 1:3 to 3:1 is preferred.

In the examples, the non-volatile ingredients were made molten by heating to a temperature of approximately 140° C. This temperature is not critical and may be varied but it is preferred that it be at least that of the softening point of the particular solids employed. As hereinbefore taught, non-volatile content is completely soluble at room temperature in the specific solvents set forth. Therefore, the melting process is not imperative and the non-volatiles may be brought into solution without it. However, since the natural dissolution of the non-volatile ingredients would require substantial time, it is preferred that the initial pre-melting process be employed as a time expedient.

If desired, an oil-soluble cationic surface-active agent, such as substituted oxzolines and quaternary ammonium salts, may be added to the composition to displace water from the metal surface to be treated. The agent is employed in a small quantity, usually .5% or less by weight of the composition.

In applying the solution, the method or vehicle of application has not been found to be limited. Any conventional means such as dipping, spraying, wiping, etc. may be employed.

We have directed our invention to an organic metal composition which is capable of rendering a hard, durable, protective and adhesive film, yet one which is non-tacky and continuous, and moreover, to a composition which remains as a true solution at room temperature until applied. In effect, this will allow application of the composition without the hazardous necessity of heat. Then too, when the protective wax film is to be removed from the coated metal surface, it is only necessary to dissolve the film at room temperature in any of the aforementioned specific solvents.

We claim:

1. A liquid protective coating solution for metals comprising from 12 to 35% by weight of the solution of a polymer of a vinyl ether having from 14 to 24 carbon atoms and a resin, having a softening point of at least 85° C., selected from the group consisting of polyhydric alcohol rosin esters, terpene resins, rosin-modified maleic alkyd resins and mixtures thereof, said ether and said resin being present in a ratio of from 1:3 to 3:1, said ether and said resin being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

2. A liquid protective coating solution for metals comprising from 12 to 35% by weight of the solution of a polymer of a vinyl ether having from 14 to 24 carbon atoms and a resin, having a softening point of at least 85° C., selected from the group consisting of polyhydric alcohol rosin esters, terpene resins, rosin-modified maleic alkyd resins and mixtures thereof, said ether and said resin being present in a ratio of from 1:3 to 3:1, said ether and said resin being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition, and an oil-soluble cationic surface-active agent.

3. A liquid protective coating solution for metals comprising from 12 to 35% by weight of the solution of a polymer of a vinyl ether having from 14 to 24 carbon atoms and a polyhydric alcohol rosin ester having a softening point of at least 85° C., said ether and said rosin ester being present in a ratio of from 1:3 to 3:1, said ether and said rosin ester being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

4. A liquid protective coating solution for metals comprising from 12 to 35% by weight of the solution of a polymer of a vinyl ether having from 14 to 24 carbon atoms and a terpene resin having a softening point of at least 85° C., said ether and said resin being present in a ratio of from 1:3 to 3:1, said ether and said resin being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

5. A liquid protective coating solution for metals comprising from 12 to 35% by weight of the solution of a polymer of a vinyl ether having from 14 to 24 carbon atoms and a rosin-modified maleic alkyd resin having a softening point of at least 85° C., said ether and said resin being present in a ratio of from 1:3 to 3:1, said ether and said maleate being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

6. A liquid protective coating solution for metals comprising from 12 to 35% by weight of the solution of a polymer of vinyl octodecyl ether and a resin, having a softening point of at least 85° C., selected from the group consisting of polyhydric alcohol rosin esters, terpene resins, rosin-modified maleic alkyd resins and mixtures thereof, said ether and said resin being present in a ratio of from 1:3 to 3:1, said ether and said resin being completely soluble at a temperature of 21° C. in a solvent selected from the group consisting of liquid hydrocarbons, liquid ethers, liquid chlorinated hydrocarbons and mixtures thereof, said solvent consituting the major portion by weight of the composition.

7. A liquid protective coating solution for metals comprising from 12 to 35% by weight of the solution of a polymer of vinyl octodecyl ether and a polyhydric alcohol rosin ester having a softening point of at least 85° C., said ether and said rosin ester being present in a ratio of from 1:3 to 3:1, said ether and said rosin ester being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

8. A liquid protective coating solution for metals comprising from 12 to 35% by weight of the solution of a polymer of vinyl octodecyl ether and a terpene resin having a softening point of at least 85° C., said ether and said resin being present in a ratio of from 1:3 to 3:1, said ether and said resin being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

9. A liquid protective coating solution for metals comprising from 12 to 35% by weight of the solution of a polymer of vinyl octodecyl ether and a rosin-modified maleic alkyd resin having a softening point of at least 85° C., said ether and said resin being present in a ratio of from 1:3 to 3:1, said ether and said resin being completely soluble at a temperature of 21° C. in a solvent selected from the group consisting of liquid hydrocarbons, liquid ethers, liquid chlorinated hydrocarbons and mixtures thereof, said solvent constituting the major portion by weight of the composition.

10. A liquid protective coating solution for metals comprising from 12 to 35% by weight of the solution of a polymer of vinyl octodecyl ether and a polyhydric alcohol rosin ester having a softening point of at least 85° C., said ether and said rosin ester being present in a ratio of from 1:3 to 3:1, said ether and said rosin ester being completely soluble at a temperature of 21° C. in a liquid hydrocarbon solvent, said solvent constituting the major portion by weight of the composition.

11. A liquid protective coating solution for metals comprising from 12 to 35% by weight of the solution of a polymer of vinyl octodecyl ether and a terpene resin having a softening point of at least 85° C., said ether and said resin being present in a ratio of from 1:3 to 3:1, said ether and said resin being completely soluble at a temperature of 21° C. in a liquid hydrocarbon solvent, said solvent constituting the major portion by weight of the composition.

12. A liquid protective coating solution for metals comprising from 12 to 35% by weight of the solution of a polymer of vinyl octodecyl ether and a rosin-modified maleic alkyd resin having a softening point of at least 85° C., said ether and said resin being present in a ratio of from 1:3 to 3:1, said ether and said resin being completely soluble at a temperature of 21° C. in a liquid hydrocarbon solvent, said solvent constituting the major portion by weight of the composition.

13. A liquid protective coating solution for metals comprising from 12 to 35% by weight of the solution of a polymer of vinyl octodecyl ether and a polyhydric alcohol rosin ester having a softening point of at least 85° C., said ether and said rosin ester being present in a ratio of 1 part of ether to 3 parts of rosin ester, said ether and said rosin ester being completely soluble at a temperature of 21° C. in a liquid hydrocarbon solvent, said solvent constituting the major portion by weight of the composition.

14. A liquid protective coating solution for metals comprising from 12 to 35% by weight of the solution of a polymer of vinyl octodecyl ether and a terpene resin having a softening point of at least 85° C., said ether and said resin being present in a ratio of 1 part of ether to 3 parts of resin, said ether and said resin being completely soluble at a temperature of 21° C. in a liquid hydrocarbon solvent, said solvent constituting the major portion by weight of the composition.

15. A liquid protective coating solution for metals comprising from 12 to 35% by weight of the solution of a polymer of vinyl octodecyl ether and a rosin-modified maleic alkyd resin having a softening point of at least 85° C., said ether and said resin being present in a ratio of 1 part of ether to 3 parts of rosin maleate, said ether and said resin being completely soluble at a temperature of 21° C. in a liquid hydrocarbon solvent, said solvent constituting the major portion by weight of the composition.

HENRY L. VOGL.
ANNA MAE STIEBER.

REFERENCES CITED

The following references are of record in the file of this patent:

FOREIGN PATENTS

| Number | Country | Date |
|--------|---------|------|
| 845,954 | France | May 22, 1939 |